April 17, 1951 S. BERMAN 2,549,567
MAGNETIC-TYPE OBJECT DETECTOR
Filed Nov. 26, 1945 3 Sheets-Sheet 1
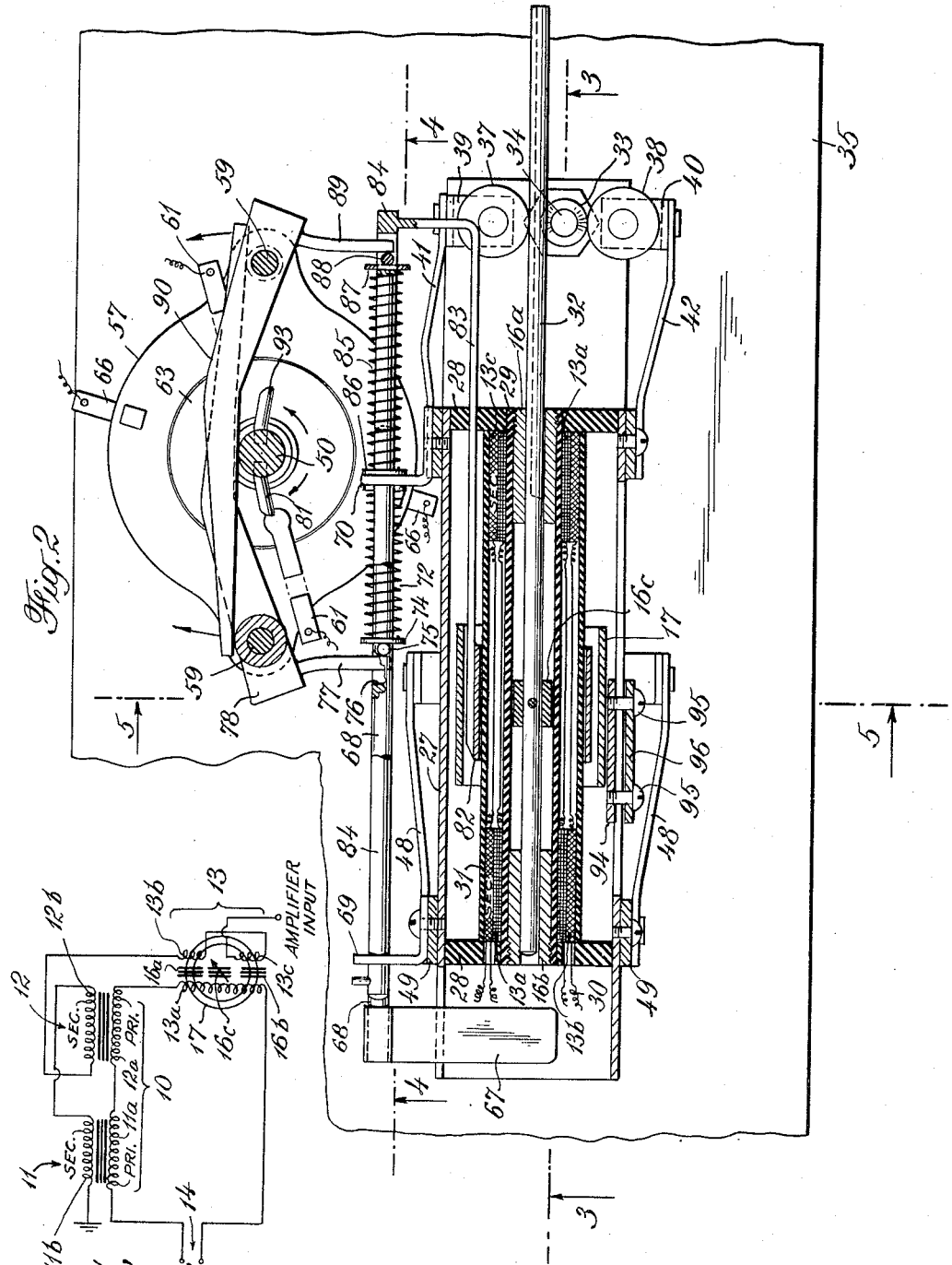
INVENTOR
Samuel Berman
BY
Pennie Davis Marvin Edmonds
ATTORNEYS April 17, 1951 S. BERMAN 2,549,567
MAGNETIC-TYPE OBJECT DETECTOR
Filed Nov. 26, 1945 3 Sheets-Sheet 2
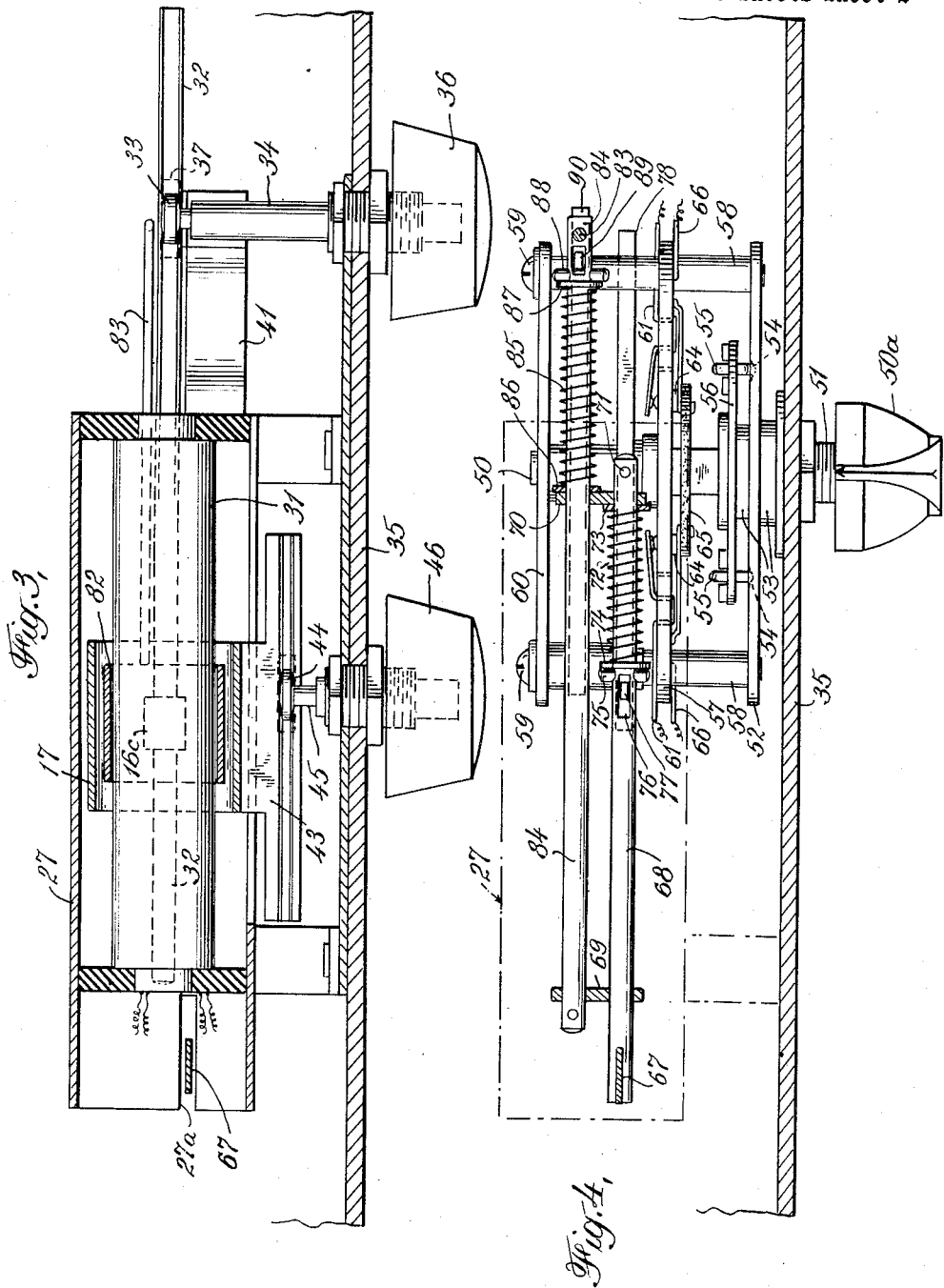
INVENTOR
Samuel Berman
BY
Pennie Davis Marvin Edmonds
ATTORNEYS

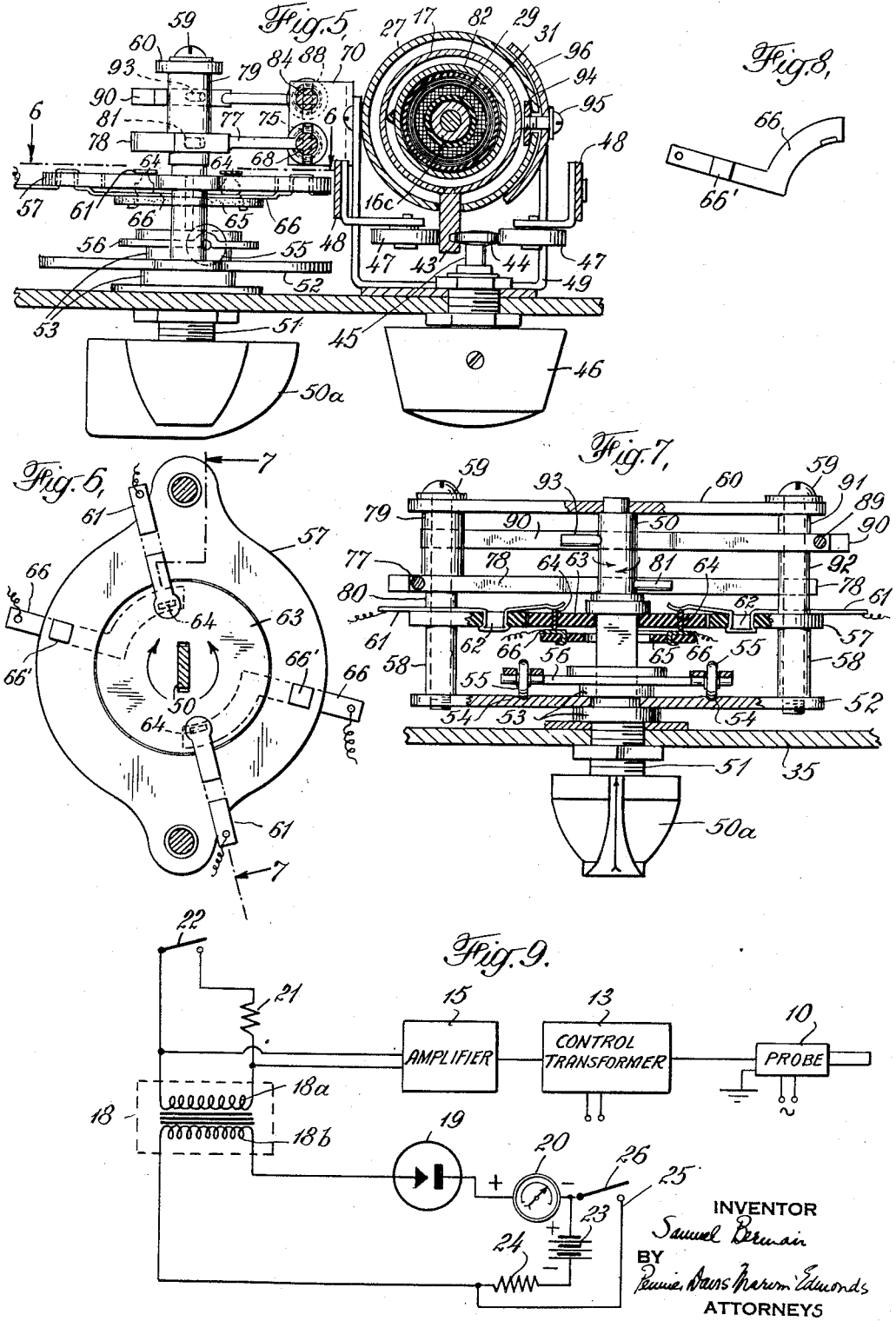

Patented Apr. 17, 1951

2,549,567

UNITED STATES PATENT OFFICE 2,549,567

MAGNETIC-TYPE OBJECT DETECTOR

Samuel Berman, New York, N. Y., assignor to Waugh Equipment Company, New York, N. Y., a corporation of Maine Application November 26, 1945, Serial No. 630,913

20 Claims. (Cl. 175—183)

This invention relates to devices for determining the presence and location of metallic particles in body tissue, forms of such devices being disclosed in my Patents 2,321,355 and 2,321,356, both issued June 8, 1943, and in my co-pending applications, Ser. No. 482,860, filed April 13, 1943, now Patent No. 2,437,455, and Serial No. 577,910, filed February 14, 1945, now Patent No. 2,450,868. More particularly, the invention has to do with improvements in such devices which, among other things, facilitate their use by simplifying the operations by which they are adjusted to place them in operating condition.

The metal locator of the patents includes a pair of transformers, referred to as a detecting transformer and a balancing transformer, which are closely similar and have their primaries connected in series while their secondaries are connected in series but opposed. The detecting transformer is mounted within the shell of a probe and the balancing transformer may be located at a distance from the probe, but is preferably mounted within the handle of the probe, for reasons set forth in the second patent. Although the transformers are brought into balance during the manufacture of the instrument, that initial balance is likely to be upset, when the instrument is put into use, because of local conditions, such as stray fields or line voltage fluctuations. Also a slight condition of unbalance is desirable for maximum sensitivity. Accordingly, means are provided for varying the output of the transformer secondaries with respect both to amplitude and phase. Such means may take the form of masses of iron and of copper mounted movably adjacent one of the transformers, as, for example, the transformer in the handle of the probe of the instrument shown in Patent 2,321,356, and adjustable to effect a balance or a selected unbalance in the voltage induced in the secondaries of the transformers. If preferred, the balancing or the establishment of a desired unbalance may be accomplished by means of a control transformer disposed at a distance from the probe and provided with movable iron and copper bodies, as disclosed in the identified applications.

In my prior instruments, the output resulting from the probe being brought into proximity to a body of metal, is fed to an amplifier and the output of the amplifier is rectified and the rectified current is then supplied to an indicating device, such as a meter. I have found that, in practice, it is sometimes difficult for an unskilled person to correctly manipulate the adjusting means so as to first establish the initial balance in the instrument and then to produce the correct unbalance necessary for maximum sensitivity. For maximum sensitivity, the detection of magnetic metals requires an exact balance in phase and a slight unbalance in amplitude, while the detection of non-magnetic metals requires an exact balance in amplitude and a slight unbalance in phase. Further, the required unbalance must, in each case, be in the correct direction in order that the indication be positive, or increasing with an approach of the probe to metal. If the unbalance should be applied in the reverse sense, then the indications would be negative or decreasing with an approach of the probe to metal, which is undesirable. Also, when the required unbalance is obtained, the needle of the meter is part way between the zero point and full scale, so that less than full scale deflection is available during the use of the instrument.

The present invention is, accordingly, directed to the provision in locators of the type referred to, of new means for both balancing the instruments and obtaining the correct degree of unbalance necessary for maximum sensitivity, the requirements in manipulation of said means being so simplified as to greatly decrease the possibility of error even at the hands of unskilled persons. The invention further includes means which make it possible to obtain a full scale deflection of the meter even when the instrument is at the required unbalance for maximum sensitivity, this means causing no interference with the tuning for either exact balance or for the required predetermined unbalance.

For a better understanding of the invention, reference may be made to the accompanying drawings, in which Fig. 1 is a wiring diagram of part of one form of the instrument, in which a control transformer is used for tuning;

Fig. 2 is a view, partly in vertical section and partly in elevation, of the control transformer and associated parts;

Figs. 3, 4 and 5 are sectional views on the lines 3—3, 4—4, and 5—5, respectively, of Fig. 2;

Fig. 6 is a sectional view on the line 6—6 of Fig. 5;

Fig. 7 is a sectional view on the line 7—7 of Fig. 6;

Fig. 8 is a plan view of a part of a switch used in the instrument; and

Fig. 9 is a wiring diagram of the instrument.

In the drawings, the instrument illustrated is of the type shown in my co-pending applications above identified, in which the probe 10 includes a detecting transformer 11 and a balancing transformer 12, the primaries 11a, 12a of which are connected in series and the secondaries 11b, 12b of which are also connected in series but in opposition. The primaries of the probe transformers are connected in series with the primary 13a of a control transformer 13 and the three primaries are supplied with alternating current from a source 14. The control transformer includes a pair of secondaries 13b, 13c, which are connected in series but are opposed to one another. One terminal of secondary 13b is connected to a terminal of secondary 12b, while the remote terminal of secondary 13c is connected to the input terminal of an amplifier 15. One terminal of secondary 11b is grounded.

The control transformer includes a pair of fixed cores 16a, 16b, on which the primary and the respective secondaries are wound, and a movable core 16c between the fixed cores, which may be adjusted to produce a difference in amplitude between the voltages induced in secondaries 13b, 13c. The control transformer also includes a copper ring 17, which may be moved relatively to the windings and fixed cores to cause a phase difference between the voltages induced in the secondaries 13b, 13c.

The secondaries 11b, 12b of the probe transformers, in all forms of my locator, are identical within manufacturing tolerances, so that when current flows through the primaries 11a, 12a, the voltages induced in the secondaries should balance with the result that the secondaries have no output. However, because of slight variations in manufacture and also of local conditions producing an unbalance, it is desirable to provide means for tuning the probe transformer secondaries to exact balance and also to the unbalanced condition, which produces maximum sensitivity of the instrument. Such tuning may be accomplished by the use of iron and copper bodies mounted in the handle of the probe, as in the construction shown in Patent 2,321,356, but I prefer to employ the control transformer 13 disclosed in the co-pending applications. By adjusting the movable core 16c of the control transformer, the secondaries 13b, 13c thereof may be unbalanced as to amplitude so that they produce an output counteracting any undesired residual output of the probe transformer secondaries 11b, 12b and thus place the entire instrument in balance. The copper ring 17 of the control transformer can be adjusted to produce a phase difference in the voltages induced in the secondaries 13b, 13c counteracting any undesired residual phase difference in the outputs of the probe transformer secondaries 11b, 12b.

One terminal of the control transformer secondary 13c is connected to the input of amplifier 15, in which the net output of the probe transformer and the control transformer, resulting from the probe being brought into proximity to a metallic body, is amplified. The amplified current goes to a power transfer device, which, in the construction illustrated, takes the form of an output transformer 18. The amplified current passes to the primary 18a of the output transformer and the secondary 18b of the transformer is connected to a rectifier tube 19 which supplies rectified current to an indicating instrument, such as a meter 20.

The movable core 16c and the copper ring 17 in the control transformer are preferably used to establish an initial balance of the instrument, so that when current is supplied to the primaries of the probe and control transformers and the probe is not in the vicinity of a metallic body, no indication will be given by meter 20. In order to facilitate such tuning to an initial balance, means are provided for reducing the voltage induced in the secondary 18b of the output transformer 18, so that the instrument will be less sensitive, and, for this purpose, a resistance 21 may be connected across one of the windings of the output transformer in a circuit containing a switch 22. In the diagram shown in Fig. 9, the resistance is connected across the output transformer primary 18a, but the same effect can be obtained by connecting the resistance across the output transformer secondary 18b, and the latter arrangement is preferred. Also, other means, such as a condenser, may be substituted for the resistance, if desired. During the tuning to initial balance by means of the movable core 16c and the copper ring 17, the switch 22 is closed and this reduces the output of transformer 18 and thus reduces the effect on the needle of meter 20 of a change in the positions of either the core 16c or the ring 17. Also the resistance is so adjusted as to prevent the meter 20 from going beyond the scale limits even under conditions of maximum unbalance.

After the instrument has been placed in exact balance, a limited degree of unbalance is desirable to give the maximum sensitivity in the use of the instrument. Such unbalance might be achieved by further adjustment of core 16c and ring 17, but it is preferable to provide a means for making an independent adjustment and such means, to be described, are included in the new instrument. When the unbalance is attained, the needle is moved above the zero point by the amount of current supplied to the meter as a result of the unbalance and such movement of the needle reduces the extent to which the needle may be further deflected when the probe is brought into proximity to the metal to be detected. It is, therefore, desirable to provide means for restoring the needle to its zero position on the meter, even though the instrument is unbalanced. For this purpose any suitable source of potential, such as the battery 23, is connected to the meter to oppose the flow of rectified current therethrough and a protective resistance 24 may be placed in circuit with the battery. A connection 25 including a switch 26 is provided to shunt out the battery and when the switch is closed, the effect of the battery is nullified. The swich is, therefore, kept in closed position during the preliminary tuning of the instrument to initial balance.

One form of control transformer suitable for use in the instrument is illustrated in Figs. 2, 3 and 5 and this transformer includes a tubular casing 27 of any suitable material, such as brass, closed with end plates 28 having axial openings, within which is seated a tube 29 of insulating material extending from end to end of the casing and forming a passage therethrough. The stationary cores 16a, 16b are mounted within the tube at its ends and the sections of the primary winding 13a are wound on the tube around the respective core. The primary winding may take the form of a single winding extending throughout the length of the tube, but it is preferable to make the winding in two sections, so that there will be a relatively weak field in the space between the cores. The secondary windings 13b and 13c are wound on the respective sections of the primary and the leads 30 for the windings pass out through one of the end plates 28. A tube 31 of insulating material extends between the end plates and encloses the pairs of windings.

A rod 32 of non-magnetic material extends through the tubular cores and has a portion projecting outside casing 27. This rod carries a sleeve of magnetic material forming the movable core 16c and the rod is movable endwise by means of a roller 33 mounted on a shaft 34, which extends through the front wall 35 of the casing, in which the control transformer is mounted. The shaft is rotatable by a knob 36 on the outside of the casing. The roller 33 runs in a groove extending lengthwise of rod 32 and the roller and rod are kept in tight engagement by rollers 37, 38 rotatably mounted on brackets 39, 40 attached to respective leaf springs 41, 42 secured to casing 27. By rotating the knob 36, rod 32 may be moved endwise to vary the position of the movable core 16c between the fixed cores 16a and 16b.

The copper ring 17 within the casing 27 has an extension 43, which projects through a slot in the casing. This extension has a lengthwise groove, in which runs a roller 44 on a shaft 45 extending through the casing wall 35 and carries a knob 46 on its outer end. Extension 43 and roller 44 are held in contact by rollers 47 which bear, respectively, on the extension 43 and roller 44 and are carried by leaf springs 48 attached to supports 49 by which the control transformer is secured to the inner surface of wall 35.

In the construction disclosed, the switches 22 and 26 are incorporated in a single switch structure, which comprises an operating shaft 50 extending through the casing wall 35 and provided with a knob 50a on its outer end. The shaft lies within a hollow stem 51 which extends through the casing wall and on which a metal plate 52 is rigidly mounted between collars 53. Plate 52 is formed with a pair of diametrically disposed depressions 54 into which rollers 55 on spring arms 56 attached to and rotating with shaft 50 enter with a snap action, when the switches are in neutral or balancing position.

An annular plate 57 of insulating material encircles shaft 50 and is held spaced from plate 52 by sleeves 58 mounted on screws 59, which extend through openings in the plate 60 seated against the rear end of shaft 50 and are threaded into openings in plate 52. Plate 57 carries diametrically disposed spring terminals 61, which have portions seated in openings 62 in plate 57. The ends of each terminal project beyond the inner and outer edges of plate 57.

A disc 63 of insulating material is mounted fast on shaft 50 in alignment with annulus 57 and the disc carries a pair of diametrically disposed contacts 64, which may be brought into engagement with the inner ends of terminals 61, which overlie the disc 63. An annular plate 65 of insulating material encircles shaft 50 and is held close to one surface of disc 63 by means of diametrically disposed terminals 66, each of which has a portion 66' seated in an opening in the annular plate 57. Each terminal 66 is of general L-shape, as shown in Fig. 8, and its curved leg lies on the surface of disc 65 in position to be engaged by one of the contacts 64 carried by disc 63. One terminal 66 may be considered to be one of the poles of switch 22, the other pole being the associated terminal 61. The other terminal 66 acts as one of the poles of switch 26 and the other pole is the second terminal 61. In the neutral or balancing position of shaft 50, both contacts 64 are in engagement with a terminal 66 and a terminal 61. When the shaft is moved through a small angle in either direction, the contacts 64 lose contact with terminals 61 and switches 22 and 26 are opened.

The control transformer is provided with means additional to core 16c and copper ring 17 for varying the output of secondaries 13b and 13c with respect to both amplitude and phase. Such additional means comprise a strip 67 of magnetic material which is mounted on a rod 68 supported for endwise movement in brackets 69, 70 attached to the tube 27. The strip 67 projects into the interior of the tube through a slot 27a cut through the wall of the tube beyond one of the end plates 28. Rod 68 projects through an opening in bracket 70 and carries a pin 71 adapted to engage one face of the bracket. A spring 72 encircles rod 68 and bears at one end against a washer 73, which is mounted on the rod and is seated against one face of bracket 70. At its other end, spring 72 bears against a washer 74 mounted on the rod and seated against a pin 75 extending through an opening in the rod. Just beyond pin 75, the rod has a slot 76 into which projects one end of a rod 77 attached to an arm 78 pivotally mounted on one of the screws 59 and held in place between sleeves 79 and 80 mounted on the screw, sleeve 79 lying between plate 60 and arm 78 and sleeve 80 between arm 78 and plate 57. Shaft 50 is provided with a pin 81 in position to engage arm 78 and, when the shaft has turned through a small angle in a clockwise direction, as shown in Fig. 2, pin 81 engages arm 78 and causes it to swing counterclockwise. The movement of the arm shifts rod 68 endwise to bring the plate 67 closer to secondary 13b of the control transformer and this alters the flux threading that secondary and thus varies the output of secondaries 13b, 13c as to amplitude.

In order to provide additional means for varying the output of secondaries 13b, 13c as to phase, a copper ring 82 is mounted within tube 27 to encircle the tube 31. Ring 82 is supported on a rod 83 of non-magnetic material which extends through one of the end plates 28 and is attached to a rod 84 supported in brackets 69, 70. Rod 84 projects beyond bracket 70 and is encircle by a spring 85, which bears at one end against a washer 86 mounted on the rod and seated against bracket 70. At its other end, the spring bears against a washer 87 mounted on the rod and seated against the pin 88 attached to the rod. Beyond pin 88, the rod is slotted to receive the end of an arm 89 attached to an arm 90 pivotally mounted on one of the screws 59 and lying between sleeves 91, 92 through which the screw extends. Sleeve 91 spaces arm 90 from plate 60 and sleeve 92 spaces arm 90 from annulus 57. A pin 93 is mounted fast on shaft 50 in position to engage arm 90. Counterclockwise movement of shaft 50 through a small angle causes pin 93 to engage arm 90 and swing it clockwise on screw 59. This results in a movement of arm 89, which causes an endwise movement of rod 84 and a corresponding movement of the copper sleeve 82.

In the manufacture of the instrument, the secondaries 13b, 13c of the control transformer are made closely similar and they are then balanced as to amplitude by means of a plate 94 of magnetic material lying within tube 27 and attached by means of screws 95, extending through a slot in the wall of the tube, to a curved plate 96 lying against the outer surface of tube 27. When the instrument is put into use, any unbalance resulting from local conditions is initially corrected by adjustment of the movable core 16c and the movable copper ring 17 of the control transformer. Before such adjustments are made, shaft 50 is placed in position with its contacts 64 connecting terminals 61, 66, so that switches 22, 26 are closed. The closing of switch 22 reduces the output of the output transformer and limits the amount of current that may flow to the meter 20, so that the instrument is less sensitive to changes in the position of the movable core 16c and the copper ring 17, and the meter needle is prevented from going beyond the scale limits, even under conditions of maximum unbalance. The closing of switch 26 establishes the shunt around the bucking voltage produced by battery 23, which would ordinarily tend to depress the needle of the meter below the zero point, and restores the meter needle to within the scale limits, so that the initial balancing operation may be completed with the aid of the meter by observing when its needle goes down to zero.

The slight unbalance in the instrument desirable for maximum sensitivity is produced by adjustment of plate 67 and ring 82. If the instrument is to be used in detecting particles of magnetic material, the desired unbalance is made with respect to amplitude by altering the position of plate 67, whereas, if the instrument is to be used in detecting particles of non-magnetic material, the unbalance is to be with respect to phase and is effected by adjustment of the copper ring 82. Such adjustments are made by turning the shaft 50 either clockwise or counterclockwise but, as soon as the shaft is turned through a small angle in either direction, contacts 64 become disengaged from terminals 61 and switches 22, 26 are opened. The instrument is, accordingly, restored to its full sensitivity by eliminating the resistance across the primary 18a of the output transformer and, at the same time, the bucking voltage provided by battery 23 becomes effective to depress the needle below the zero point. The shaft 50 is then turned by its knob 50a until either plate 67 or ring 82 has moved sufficiently to cause the needle of meter 20 to rise to the zero point, at which time an unbalance between the control transformer secondaries has been produced which is just sufficient to counteract the bucking voltage. Accordingly, the value of the bucking voltage has been used to determine the optimum amount of unbalance. At the completion of the tuning adjustments described, the instrument is in a condition for maximum sensitivity and the needle of the meter is at zero, so that a full scale deflection may be obtained.

In the construction described, the auxiliary tuning for maximum sensitivity is effected by means within the control transformer, but such auxiliary tuning may be provided in the probe itself, when the main tuning means are mounted in the probe, as in the construction shown in my second patent. Also, the switches 22, 26 have been illustrated as controlled by the auxiliary tuning shaft 50, but it will be apparent that the switches may be provided with operating means independent of shaft 50 and also independent of one another, if desired. However, it is desirable to provide a single means for operating both switches, since both should be either opened or closed at the same time. By constructing the switches so that they may be opened and closed in unison by means of the auxiliary tuning shaft 50, a single knob on the control panel may be used for both operating the switches and carrying on the auxiliary tuning. This simplifies the tuning operation and facilitates the use of the instrument by unskilled personnel.

I claim:

1. In a metal locator adapted to locate the position of metallic particles in body tissue including a pair of transformers having their primaries connected to a source of electrical energy and their secondaries connected in series but opposed, variable balancing means for said secondaries operable to counteract any difference in voltage between the two secondaries either in amplitude or in phase, whereby the output of said secondaries in combination with the output of said balancing means will form a total output of a predetermined amount in the absence of metal adjacent the secondaries and means for amplifying and indicating said total output; the improvement in a sensitivity control system therefor comprising auxiliary means for varying the output of the balancing means with respect to its amplitude, whereby said total output may be caused to deviate from said predetermined amount to impart greater sensitivity of indication in the location of magnetic particles.

2. In a metal locator adapted to locate the position of metallic particles in body tissue including a pair of transformers having their primaries connected to a source of electrical energy and their secondaries connected in series but opposed, variable balancing means for said secondaries operable to counteract any difference in voltage between the two secondaries either in amplitude or in phase, whereby the output of said secondaries in combination with the output of said balancing means will form a total output of a predetermined amount in the absence of metal adjacent the secondaries and means for amplifying and indicating said total output; the improvement in a sensitivity control system therefor comprising auxiliary means for varying the output of the balancing means with respect to its phase, whereby said total output may be caused to deviate from said predetermined amount to impart greater sensitivity of indication in the location of non-magnetic particles.

3. In a metal locator adapted to locate the position of metallic particles in body tissue including a pair of transformers having their primaries connected to a source of electrical energy and their secondaries connected in series but opposed, variable balancing means for said secondaries operable to counteract any difference in voltage between the two secondaries either in amplitude or in phase, whereby the output of said secondaries in combination with the output of said balancing means will form a total output of a predetermined amount in the absence of metal adjacent the secondaries and means for amplifying and indicating said total output; the improvement in a sensitivity control system therefor comprising auxiliary means for varying the output of the balancing means with respect to its amplitude and auxiliary means for varying the output of the balancing means with respect to its phase, whereby said total output may be caused to deviate from said predetermined amount to impart greater sensitivity of indication in the location of magnetic and non-magnetic particles.

4. In a metal locator adapted to locate the position of metallic particles in body tissue including a pair of transformers having their primaries connected to a source of electrical energy and their secondaries connected in series but opposed, variable balancing means for said secondaries operable to counteract any difference in voltage between the two secondaries either in amplitude or in phase, whereby the output of said secondaries in combination with the output of said balancing means will form a total output of a predetermined amount in the absence of metal adjacent the secondaries and means for amplifying and indicating said total output; the improvement in a sensitivity control system therefor comprising means for reducing the amplified total output while the output of the balancing means is being varied, whereby danger of overloading the indicating means is lessened, auxiliary means for varying the output of the balancing means with respect to its amplitude, whereby said total output may be caused to deviate from said predetermined amount to impart greater sensitivity of indication in the location of magnetic particles, a source of potential opposing the amplified total output for setting the optimum amount of deviation between the total output and said predetermined amount, and control means for the amplified total-output-reducing means and the source of potential, said control means including a movable member operable in one position to render the amplified total-output-reducing means effective and the source of potential ineffective, and operable in all other positions to render the amplified total-output-reducing means ineffective and the source of potential effective.

5. In a metal locator adapted to locate the position of metallic particles in body tissue including a pair of transformers having their primaries connected to a source of electrical energy and their secondaries connected in series but opposed, variable balancing means for said secondaries operable to counteract any difference in voltage between the two secondaries either in amplitude or in phase, whereby the output of said secondaries in combination with the output of said balancing means will form a total output of a predetermined amount in the absence of metal adjacent the secondaries and means for amplifying and indicating said total output; the improvement in a sensitivity control system therefor comprising means for reducing the amplified total output while the output of the balancing means is being varied, whereby danger of overloading the indicating means is lessened, auxiliary means for varying the output of the balancing means with respect to its phase, whereby said total output may be caused to deviate from said predetermined amount to impart greater sensitivity of indication in the location of non-magnetic particles, a source of potential opposing the amplified total output for setting the optimum amount of deviation between the total output and said predetermined amount, and control means for the amplified total-output-reducing means and the source of potential, said control means including a movable member operable in one position to render the amplified total-output-reducing means effective and the source of potential ineffective, and operable in all other positions to render the amplified total-output-reducing means ineffective and the source of potential effective.

6. In a metal locator adapted to locate the position of metallic particles in body tissue including a pair of transformers having their primaries connected to a source of electrical energy and their secondaries connected in series but opposed, variable balancing means for said secondaries operable to counteract any difference in voltage between the two secondaries either in amplitude or in phase, whereby the output of said secondaries in combination with the output of said balancing means will form a total output of a predetermined amount in the absence of metal adjacent the secondaries and means for amplifying and indicating said total output; the improvement in a sensitivity control system therefor comprising means for reducing the amplified total output while the output of the balancing means is being varied, whereby danger of overloading the indicating means is lessened, auxiliary means for varying the output of the balancing means with respect to its amplitude, auxiliary means for varying the output of the balancing means with respect to its phase, whereby said total output may be caused to deviate from said predetermined amount to impart greater sensitivity of indication in the location of either magnetic or non-magnetic particles, a source of potential opposing the amplified total output for setting the optimum amount of deviation between the total output and said predetermined amount, and control means for the amplified total-output-reducing means and the source of potential, said control means including a movable member operable in one position to render the amplified total-output-reducing means effective and the source of potential ineffective, and operable in all other positions to render the amplified total output-reducing-means ineffective and the source of potential effective.

7. In a metal locator and sensitivity control therefor as set forth in claim 3, in which both of said auxiliary means are operative by a change of their positions relative to said balancing means, and which includes means for changing the position of both of said auxiliary means with respect to the balancing means.

8. In a metal locator and sensitivity control therefor as set forth in claim 3, in which both of said auxiliary means are operative by a change of their positions relative to said balancing means, and which includes a single means for changing the position of both of said auxiliary means with respect to said balancing means, said single means including a movable member which, when moved in one direction from a neutral position, operates one of said auxiliary means, and which, when operated in another direction, operates the other of said auxiliary means.

9. In a metal locator and sensitivity control therefor as set forth in claim 6, in which both of said auxiliary means are operative by a change of their positions relative to said balancing means, and which includes means for changing the position of both of said auxiliary means relative to the balancing means.

10. In a metal locator and sensitivity control therefor as set forth in claim 6, in which both of said auxiliary means are operative by a change of their positions relative to said balancing means, and which includes a single means for changing the position of both of said auxiliary means with respect to said balancing means, said single means including a movable member which, when moved in one direction from a neutral position, operates one of said auxiliary means, and which, when operated in another direction, operates the other of said auxiliary means.

11. In a metal locator adapted to locate the position of metallic articles in body tissue including a pair of transformers having their primaries connected to a source of electrical energy and their secondaries connected in series but opposed, a control transformer having its primaries connected to a source of electrical energy and having its secondaries connected in series with each other but opposed and in series with the secondaries of said pair of transformers, means for amplifying and indicating the total output of all of said secondaries and means for varying the voltages induced in the secondaries of said control transformer with respect to amplitude and with respect to phase, whereby the output of the secondaries of said control transformer may balance the output of the secondaries of said pair of transformers; the improvement in a sensitivity control system therefor comprising auxiliary means for varying the voltages induced in the secondaries of the control transformer with respect to amplitude, whereby an unbalance may be caused between the output of the control transformer secondaries and the output of the secondaries of the pair of transformers to impart greater sensitivity of indication in the location of magnetic particles.

12. In a metal locator adapted to locate the position of metallic particles in body tissue including a pair of transformers having their primaries connected to a source of electrical energy and their secondaries connected in series but opposed, a control transformer having its primaries connected to a source of electrical energy and having its secondaries connected in series with each other but opposed and in series with the secondaries of said pair of transformers, means for amplifying and indicating the total output of all of said secondaries and means for varying the voltages induced in the secondaries of said control transformer with respect to amplitude and with respect to phase, whereby the output of the secondaries of said control transformer may balance the output of the secondaries of said pair of transformers; the improvement in a sensitivity control system therefor comprising auxiliary means for varying the voltages induced in the secondaries of the control transformer with respect to phase, whereby an unbalance may be caused between the output of the control transformer secondaries and the output of the secondaries of the pair of transformers to impart greater sensitivity of indication in the location of non-magnetic particles.

13. In a metal locator adapted to locate the position of metallic particles in body tissue including a pair of transformers having their primaries connected to a source of electrical energy and their secondaries connected in series but opposed, a control transformer having its primaries connected to a source of electrical energy and having its secondaries connected in series with each other but opposed and in series with the secondaries of said pair of transformers, means for amplifying and indicating the total output of all of said secondaries and means for varying the voltages induced in the secondaries of said control transformer with respect to amplitude and with respect to phase, whereby the output of the secondaries of said control transformer may balance the output of the secondaries of said pair of transformers; the improvement in a sensitivity control system therefor comprising auxiliary means for varying the voltages induced in the secondaries of the control transformer with respect to amplitude, and auxiliary means for varying the voltages induced in the secondaries of the control transformer with respect to phase, whereby an unbalance may be caused between the output of the control transformer secondaries and the output of the secondaries of the pair of transformers to impart greater sensitivity of indication in the location of either magnetic or non-magnetic particles.

14. In a metal locator adapted to locate the position of metallic particles in body tissue including a pair of transformers having their primaries connected to a source of electrical energy and their secondaries connected in series but opposed, a control transformer having its primaries connected to a source of electrical energy and having its secondaries connected in series with each other but opposed and in series with the secondaries of said pair of transformers, means for amplifying and indicating the total output of all of said secondaries and means for varying the voltages induced in the secondaries of said control transformer with respect to amplitude and with respect to phase, whereby the output of the secondaries of said control transformer may balance the output of the secondaries of said pair of transformers; the improvement in a sensitivity control system therefor comprising means for reducing the amplified total output while voltages induced in the control transformer are being varied, whereby danger of overloading the indicating means is lessened, auxiliary means for varying the voltages induced in the secondaries of the control transformer with respect to amplitude, whereby the output of said control transformer secondaries may be caused to deviate from the output of the secondaries of said pair of transformers to impart greater sensitivity of indication in the location of magnetic particles, a source of potential opposing the amplified total output for setting the optimum amount of deviation between the output of the control transformer secondaries and the output of the secondaries of the pair of transformers, and control means for the amplified total-output-reducing means and the source of potential, said control means including a movable member operable in one position to render the amplified total-output-reducing means effective and the source of potential ineffective, and operable in all other positions to render the amplified total-output-reducing means ineffective and the source of potential effective.

15. In a metal locator adapted to locate the position of metallic particles in body tissue including a pair of transformers having their primaries connected to a source of electrical energy and their secondaries connected in series but opposed, a control transformer having its primaries connected to a source of electrical energy and having its secondaries connected in series with each other but opposed and in series with the secondaries of said pair of transformers, means for amplifying and indicating the total output of all of said secondaries and means for varying the voltages induced in the secondaries of said control transformer with respect to amplitude and with respect to phase, whereby the output of the secondaries of said control transformer may balance the output of the secondaries of said pair of transformers; the improvement in a sensitivity control system therefor comprising means for reducing the amplified total output while voltages induced in the control transformer are being varied, whereby danger of overloading the indicating means is lessened, auxiliary means for varying the voltages induced in the secondaries of the control transformer with respect to phase, whereby the output of said control transformer secondaries may be caused to deviate from the output of the secondaries of said pair of transformers to impart greater sensitivity of indication in the location of non-magnetic particles, a source of potential opposing the amplified total output for setting the optimum amount of deviation between the output of the control transformer secondaries and the output of the secondaries of the pair of transformers, and control means for the amplified total-output-reducing means and the source of potential, said control means including a movable member operable in one position to render the amplified total-output-reducing means effective and the source of potential ineffective, and operable in all other positions to render the amplified total-output-reducing means ineffective and the source of potential effective.

16. In a metal loctator adapted to locate the position of metallic particles in body tissue including a pair of transformers having their primaries connected to a source of electrical energy and their secondaries connected in series but opposed, a control transformer having its primaries connected to a source of electrical energy and having its secondaries connected in series with each other but opposed and in series with the secondaries of said pair of transformers, means for amplifying and indicating the total output of all of said secondaries and means for varying the voltages induced in the secondaries of said control transformer with respect to amplitude and with respect to phase, whereby the output of the secondaries of said control transformer may balance the output of the secondaries of said pair of transformers; the improvement in a sensitivity control system therefor comprising means for reducing the amplified total output while voltages induced in the control transformer are being varied, whereby danger of overloading the indicating means is lessened, auxiliary means for varying the voltages induced in the secondaries of the control transformer with respect to amplitude, auxiliary means for varying the voltages induced in the secondaries with respect to phase, whereby the output of said control transformer secondaries may be caused to deviate from the output of the secondaries of said pair of transformers to impart greater sensitivity of indication in the location of either magnetic or non-magnetic particles, a source of potential opposing the amplified total output for setting the optimum amount of deviation between the output of the control transformer secondaries and the output of the secondaries of the pair of transformers, and control means for the amplified total-output-reducing means and the source of potential, said control means including a movable member operable in one position to render the amplified total-output-reducing means effective and the source of potential ineffective, and operable in all other positions to render the amplified total-output-reducing means ineffective and the source of potential effective.

17. In a metal locator and sensitivity control therefor as set forth in claim 36, in which both of said auxiliary means are operative by a change of position relative to the control transformer, and which includes means for changing the position of said auxiliary means with respect to the control transformer.

18. In a metal locator and sensitivity control therefor as set forth in claim 13, in which both of said auxiliary means are operative by a change of position relative to the control transformer, and which includes a single means for changing position of both of said auxiliary means with respect to the control transformer, said single means including a rotatable member which, when moved in one direction from a neutral position, operates one of said auxiliary means, and which, when moved in another direction from said neutral position, operates the other of said auxiliary means.

19. In a metal locator and sensitivity control therefor as set forth in claim 16, in which both of said auxiliary means are operative by a change of position relative to the control transformer, and which includes means for changing the position of said auxiliary means with respect to the control transformer.

20. In a metal locator and sensitivity control therefor as set forth in claim 16, in which both of said auxiliary means are operative by a change of position relative to the control transformer, and which includes a single means for changing the position of both of said auxiliary means with respect to the control transformer, said single means including a rotatable member which, when moved in one direction from a neutral position, operates one of said auxiliary means, and which, when moved in another direction from said neutral position, operates the other of said auxiliary means.

SAMUEL BERMAN.

REFERENCES CITED

The following references are of record in the file of this patent:

UNITED STATES PATENTS

| Number | Name | Date |
|---|---|---|
| 2,321,355 | Berman | June 8, 1943 |
| 2,321,356 | Berman | June 8, 1943 |
| 2,437,455 | Berman | Mar. 9, 1948 |
| 2,450,868 | Berman | Oct. 12, 1948 |